US009183336B1

(12) United States Patent
Bourgeault et al.

(10) Patent No.: US 9,183,336 B1
(45) Date of Patent: Nov. 10, 2015

(54) AUTOMATIC ASYNCHRONOUS SIGNAL PIPELINING

(71) Applicant: Altera Corporation, San Jose, CA (US)

(72) Inventors: Mark Bourgeault, Mississauga (CA); Ryan Fung, Mississauga (CA); David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/447,244

(22) Filed: Jul. 30, 2014

Related U.S. Application Data

(62) Division of application No. 14/010,356, filed on Aug. 26, 2013, now Pat. No. 8,832,627, which is a division of application No. 12/651,982, filed on Jan. 4, 2010, now Pat. No. 8,539,414, which is a division of application No. 11/437,950, filed on May 19, 2006, now Pat. No. 7,676,768.

(51) Int. Cl.
*G06F 17/50* (2006.01)
*H03K 19/177* (2006.01)
*H03K 19/003* (2006.01)

(52) U.S. Cl.
CPC .......... *G06F 17/505* (2013.01); *G06F 17/5077* (2013.01); *H03K 19/00323* (2013.01); *H03K 19/17736* (2013.01)

(58) Field of Classification Search
CPC .... G06F 1/10; G06F 2217/62; G06F 17/5077
USPC ......... 716/100–101, 108–110, 113–114, 126, 716/134
See application file for complete search history.

(56) References Cited

U.S. PATENT DOCUMENTS

2006/0117285 A1   6/2006  Kosugi et al.

OTHER PUBLICATIONS

Chow et al., "EVE: A CAD Tool for Manual Placement and Pipelining Assistance of FPGA Circuits," ACM, Feb. 2002, pp. 85-94.
"Xilinx and Accelchip Deliver Industry's First Design Flow From Matlab/simulink and System Generator to Verified FPGA System"; www.xilinx.com/prs_rls/ip/0535x1nx_accelchip.htm. Aug. 31, 2006.
U.S. Patent Application titled "Automatic Asynchronous Signal Pipelining," filed May 19, 2006, U.S. Appl. No. 11/437,950.

(Continued)

*Primary Examiner* — Paul Dinh
(74) *Attorney, Agent, or Firm* — Weaver Austin Villeneuve & Sampson LLP

(57) ABSTRACT

An electronic design automation (EDA) tool alters a user's netlist to provide timing success for distribution of asynchronous signals. Distribution networks are used with the addition of pipeline registers before and/or after the distribution buffer. Or, a tree of pipeline registers is inserted between the asynchronous source and the destination registers. Or, any number of distribution networks are stitched together and pipeline stages may be inserted before and/or after each distribution buffer. Or, beneficial skew is utilized by introducing a delay component that skews a clock signal. The skewed clock signal drives a pipeline register that is inserted before a distribution buffer in order to improve timing margin. Any of various compilation techniques may be used within the EDA tool to solve the problem of distributing high-speed, high-fanout asynchronous signals. The technique has utility for high-performance FPGAs and structured ASIC families, as well as for low-cost FPGAs and other types of logic devices.

20 Claims, 9 Drawing Sheets

Distribution of Signals Using Quadrant Networks

(56) References Cited

OTHER PUBLICATIONS

Office Action mailed Sep. 9, 2008, for U.S. Appl. No. 11/437,950.
Final Office Action mailed Feb. 6, 2009, for U.S. Appl. No. 11/437,950.
Notice of Allowance for U.S. Appl. No. 11/437,950, mailed Jun. 2, 2009.
Supplemental Notice of Allowance for U.S. Appl. No. 11/437,950, mailed Oct. 19, 2009.
Allowed Claims for U.S. Appl. No. 11/437,950.
Office Action mailed Nov. 17, 2011, for U.S. Appl. No. 11/651,982.
Final Office Action mailed Mar. 15, 2012 for U.S. Appl. No. 12/651,982.
Notice of Allowance for U.S. Appl. No. 12/651,982 mailed May 31, 2013.
Allowed Claims for U.S. Appl. No. 12/651,982.
Office Action mailed Nov. 14, 2013, for U.S. Appl. No. 14/010,356.
Final Office Action mailed Feb. 21, 2014, for U.S. Appl. No. 14/010,356.
Ex Parte Quayle Action mailed Apr. 3, 2014, for U.S. Appl. No. 14/010,356.
Notice of Allowance for U.S. Appl. No. 14/010,356 mailed May 15, 2014.
Allowed Claims for U.S. Appl. No. 14/010,356.

Example Chip-wide Reset Network

Chip-wide Reset Network with Pipeline Stage

Chip-wide Reset Network with Pipeline Tree

Pipeline Register Insertion Example

Distribution of Signals Using Quadrant Networks

Using Beneficial Clock Skew to Increase Utility of a Global Network

AUTOMATIC ASYNCHRONOUS SIGNAL PIPELINING

CROSS-REFERENCE TO RELATED APPLICATION

This application is a divisional of and claims priority to co-pending and commonly assigned U.S. patent application Ser. No. 14/010,356, filed Aug. 26, 2013 and titled "AUTOMATIC ASYNCHRONOUS SIGNAL PIPELINING", which is a divisional of and claims priority to U.S. patent application Ser. No. 12/651,982, now U.S. Pat. No. 8,539,414, filed Jan. 4, 2010 and titled "AUTOMATIC ASYNCHRONOUS SIGNAL PIPELINING", which is a divisional of and claims priority to U.S. patent application Ser. No. 11/437,950, filed May 19, 2006, now U.S. Pat. No. 7,676,768, and titled "AUTOMATIC ASYNCHRONOUS SIGNAL PIPELINING", all of which are hereby incorporated by reference in their entirety and for all purposes.

FIELD OF THE INVENTION

The present invention relates generally to design of an integrated circuit. More specifically, the present invention relates to automatically inserting pipeline registers during compilation of a logic design.

BACKGROUND OF THE INVENTION

Various electronic design automation (EDA) tools are useful for automating the processes by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed.

As the performance requirements on FPGA designs increase (for example), it becomes increasingly difficult to distribute high-fanout signals across the chip within a single clock cycle. One of the most common high-fanout signals used in modern FPGA designs is a chip-wide asynchronous reset signal. In order to ensure proper device operation, it is important for this signal to arrive at all destination registers within the same clock cycle. This design requirement is often verified through a recovery and removal analysis performed by a timing analyzer, which is commonly implemented in many EDA tools.

For low-speed and medium-speed designs, the user has two viable options for effectively distributing an asynchronous signal: 1) use a low-skew distribution network that reaches all of, or a subset of, the target device (subsequently referred to by the terms chip-wide distribution network and distribution network, respectively) or 2) select routing resources to connect the asynchronous signal to all of its destinations (e.g., R4, R24, C4, and/or C16 resources in an Altera Stratix™ device). For sufficiently high-speed designs, neither of these options can be used to distribute the signal quickly enough to meet the timing requirement imposed on the asynchronous signal. In other words, traditional placement and routing techniques can result in failed circuit timing. Forcing the user to manually alter his or her design to satisfy this timing requirement is cumbersome and potentially sub-optimal. Therefore, a technique for distributing asynchronous signals within a logic design is desirable, such that aggressive timing requirements imposed on these signals are satisfied.

SUMMARY OF THE INVENTION

To achieve the foregoing, and in accordance with the purpose of the present invention, a technique is disclosed that identifies and fixes situations where traditional placement and routing techniques result in failed circuit timing. This technique, which can be implemented in electronic design automation (EDA) tools, automatically alters a user's netlist to provide timing success for distribution of asynchronous signals.

In one embodiment, a distribution network is used to connect an asynchronous signal to any number of user destination registers. Pipeline registers are inserted between the asynchronous signal source and the source buffer of the distribution network (subsequently referred to as a distribution network buffer) to ensure that the asynchronous signal arrives at all of its destination registers within the same clock cycle. Alternatively, pipeline registers can also be inserted between the distribution network buffer and the destination registers.

A second embodiment is used when the delay from the distribution network buffer to the destination registers (subsequently referred to as the delay of the network) results in failed circuit timing. In this embodiment, a distribution network is not used. Instead, in order to satisfy the timing requirements, pipeline registers are inserted between the asynchronous signal source and the destination registers.

A third embodiment takes advantage of the possibility of using multiple distribution networks to distribute a single asynchronous signal to the user destination registers. This embodiment has an advantage over the first embodiment when the target device contains distribution networks that reach a strict subset of the device's resources. Typically, the worst-case delay of a distribution network decreases (i.e., the network becomes faster) as the area that is reachable by the distribution network is reduced. In this embodiment, the signal is routed from the asynchronous signal source to each of the selected distribution network buffers. Additionally, pipeline registers are inserted between the asynchronous signal source and each of the selected distribution network buffers. The connection between the asynchronous signal source and an arbitrary destination register is realized by selecting an appropriate distribution network that reaches that particular destination register. Since the delay of a distribution network that reaches a strict subset of the device is typically less than the delay of a chip-wide distribution network, faster timing may be achieved by inserting pipeline stages between the asynchronous source and the distribution network buffers. Alternatively, pipeline registers can also be inserted between the distribution network buffer and the destination registers.

A fourth embodiment takes advantage of beneficial skew in order to increase the utility of a distribution network. In this embodiment, beneficial skew is utilized by introducing a delay component that skews a clock signal to create a skewed clock signal. The skewed clock signal is used to clock, at least, a register just before the distribution network buffer. The result is a looser timing requirement from that register to the destination registers; but this can also result in a corresponding tighter timing requirement on any synchronous register-to-register transfers ending on the register feeding the distribution network buffer—unless the skewed clock signal also clocks the source registers of those transfers. Alternatively, pipeline registers can also be inserted between the distribution network buffer and the destination registers.

The technique has utility for, but not limited to, FPGA devices, structured ASIC devices, custom devices, and other types of programmable logic devices. The technique is useful for distribution of any type of asynchronous signal, especially the distribution of high-fanout signals across a substantial portion of a synchronous design, where the signal must reach all destinations within a single clock cycle. The technique is advantageous because an electronic design automation tool alters the netlist automatically without the need for a user to manually alter his or her design.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention describes an asynchronous signal pipelining technique used within an electronic design automation (EDA) software tool. In one embodiment, this EDA tool is the Quartus II software available from Altera Corporation of San Jose, Calif. In this embodiment, this technique is implemented, in part, during a physical synthesis operation. The technique improves performance of a design by inserting an arbitrary number of balanced pipeline stages after nodes that drive asynchronous ports on registers in the user's design. Although the insertion of pipeline stages changes the simulation results of a user's design, this netlist modification is functionally correct provided the user's design does not contain a register with connected asynchronous clear/load ports that requires the asynchronous signal to have a predictable latency. For the present discussion, an asynchronous signal represents a signal that can be treated as if it were asynchronously generated.

Inserting a balanced number of pipeline stages between the source and destinations of the asynchronous signal will significantly increase the likelihood that the signal can be distributed across an entire device such that the signal reaches all the destination registers in the same clock cycle. Although this insertion can be done manually by the hardware developer, this insertion is well-suited to an automated physical synthesis algorithm that chooses the best pipelining arrangement based on the timing parameters of the device, the timing requirements of the user's circuit, and the placement selected by the EDA tool.

Overview

In many designs an asynchronous signal needs to be distributed to a large number of registers. The automated insertion of pipeline stages on these signals allows the performance of these designs to dramatically increase.

Figure 1:
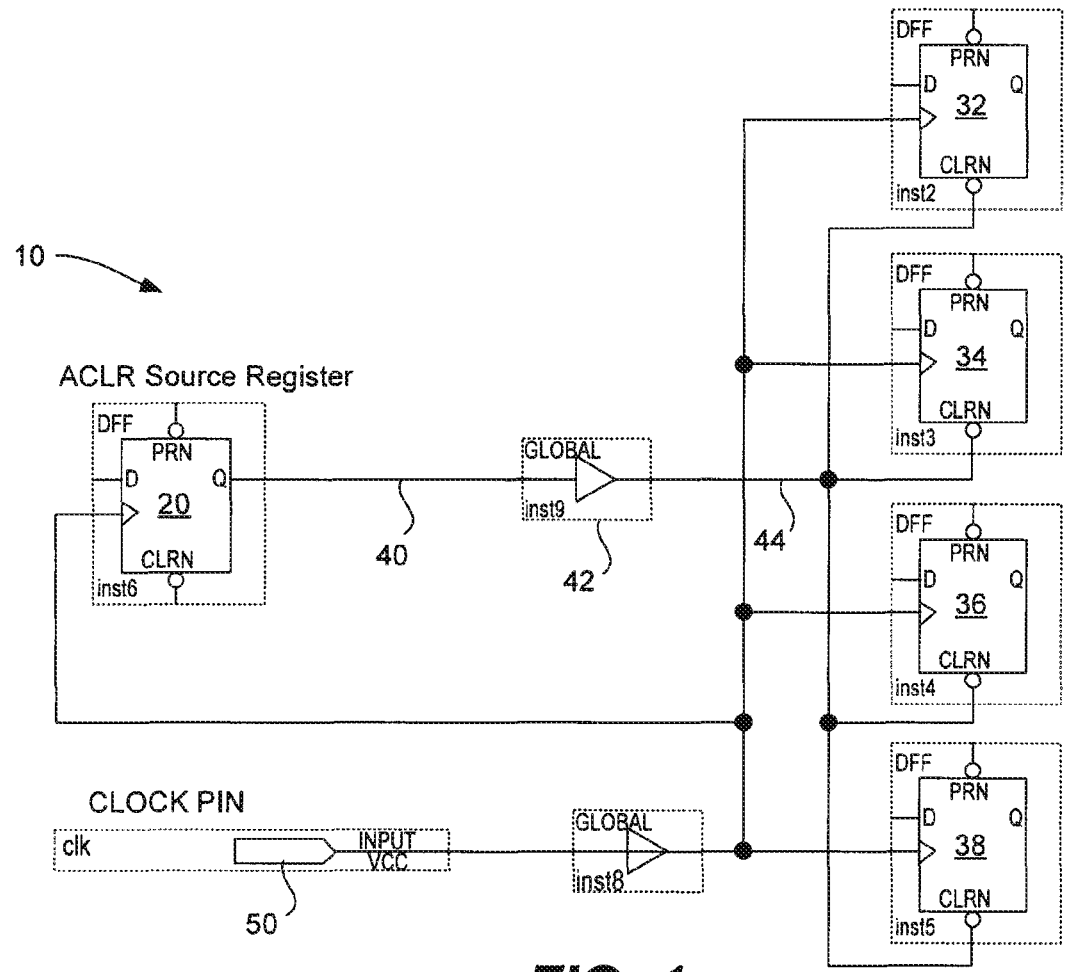
FIG. 1 illustrates an example of how an asynchronous, chip-wide reset signal is distributed through a chip-wide (i.e., global) distribution network of a circuit.

FIG. 1 illustrates an example chip-wide reset signal of a circuit 10. Shown is a source register 20 and four destination registers 32-38. Source register 20 outputs signal 40, representing a captured user asynchronous reset signal. Signal 40 connects to the asynchronous clear port of all the registers in the design (only four physical user registers are used in the figure for illustrative purposes) via distribution network buffer 42 and a chip-wide distribution network 44. In this example, distribution network buffer 42 is located reasonably far away from source register 20. This design assumes that the worst-case delay, in the target device, from source register 20 to distribution network buffer 42 is 3 ns. This design also assumes that the worst-case delay, in the target device, through distribution network 44 (i.e., from the distribution network buffer 42 to the destination registers 32-38) is also 3 ns.

Low-skew distribution networks are often used to distribute high-fanout asynchronous signals because they 1) connect to most or all of the required destinations, 2) have reasonably low delay, 3) experience minimal skew between destinations (which is beneficial for timing of other register-to-register transfers in the design), and 4) are often present in electronic devices. For devices with prefabricated distribution networks, such as PLDs and structured ASICs, using these networks saves other resources on the device from being consumed by the design. Given these attributes, the use of a chip-wide distribution network for an asynchronous signal will usually satisfy the timing requirements imposed on that signal.

Although low-skew networks can often route a signal to all of its destinations within the same clock cycle, there is still a strong desire to route the asynchronous signal to all destination registers within exactly one clock cycle. This desire exists due to the variability in the delays that occur between different physical implementations of the same logic design. This variability in delays is typically caused by manufacturing limitations. Therefore, the recovery and removal timing analysis considers a range of delays for each component involved in routing the asynchronous signal to all of its destinations, in order to determine if the user's circuit will function correctly. For example, some device instances that implement circuit 10 may only require 2 ns for asynchronous signal 40, starting at source register 20, to reach distribution network buffer 42. Similarly, the time required for signal 44 to travel between distribution network buffer 42 and destination registers 32-38 may also be 2 ns. Recovery and removal analysis is a standard type of timing analysis performed on a logic design to verify that all transitions of asynchronous signals are processed at the destination registers on the same clock cycle.

For circuit 10, assuming a 250 MHz clock frequency, it is likely that the design will work correctly if the timing characteristics of a particular physical device are close to the worst-case delays, since the asynchronous signal at the output of register 20 will reach all destination registers in the same clock cycle, since the skew of the distribution network is low. It is possible, however, that "fast" devices can experience a delay of approximately 4 ns between source register 20 and destination registers 32-38. In this situation, it is very likely that these devices will not work correctly since signal 40 will reach the destination registers at the same time as the clock signal, causing the destination registers to be placed into an unknown state. If this situation occurs, the user's circuit may not function correctly. We observe that the timing requirements on the asynchronous signal will be satisfied, regardless of the effects of manufacturing variability, provided the worst-case delay of all the register-to-register transfers is less than the clock period. Register-to-register transfers can include 1) source register to pipeline register connections, 2) source register to destination register connections, 3) pipeline register to pipeline register connections, and 4) pipeline register to destination register connections.

Although it may be possible to move source register 20 closer to distribution network buffer 42 to reduce the overall path delay, there may be other factors (e.g., user placement constraints or other timing considerations) that reject this operation. It is realized, though, that it is perfectly legal to insert a pipeline register immediately before the global buffer to balance the delay from the source register 20 to the destination registers 32-38. We observe that, in some target devices, it will not be possible to move the distribution network buffer closer to the destination registers, nor will it be possible to add pipelined registers between the distribution network buffer and the destination registers.

Figure 2:
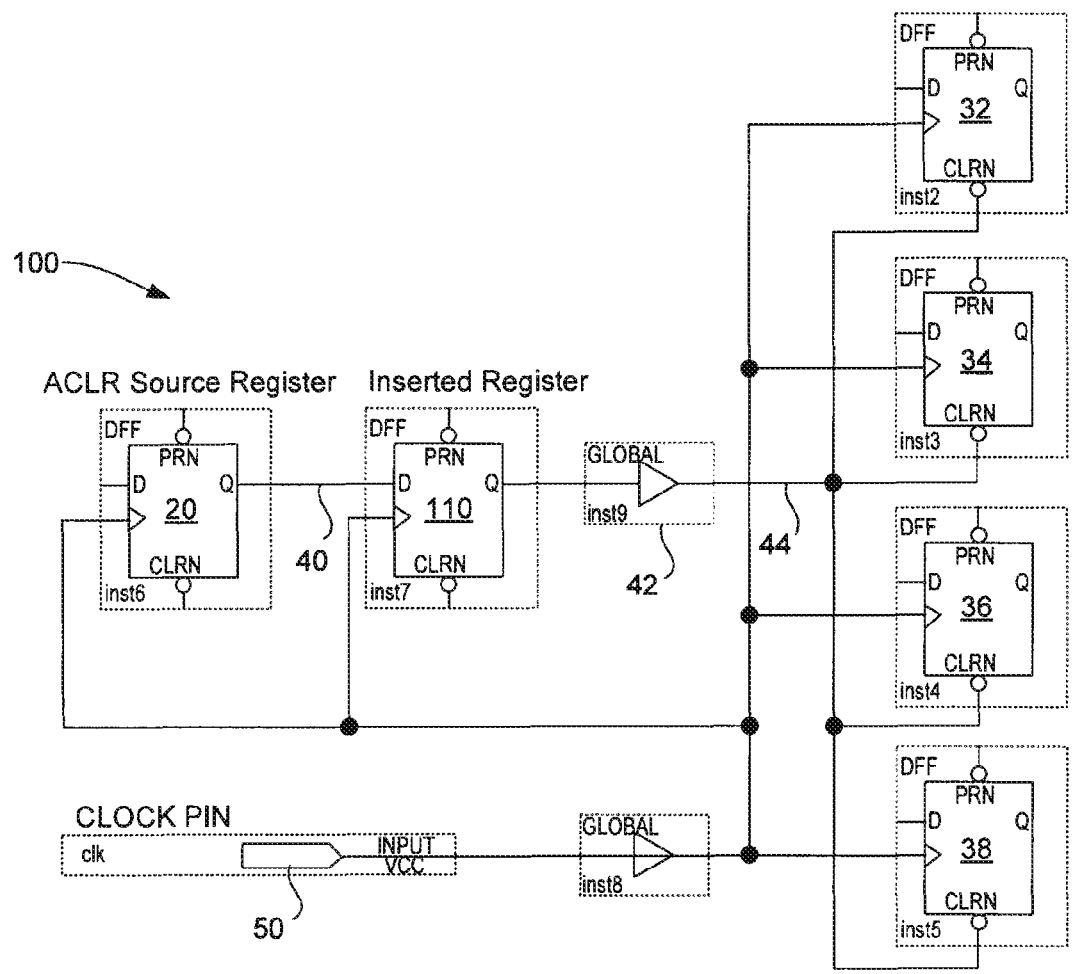
FIG. 2 illustrates distribution of an asynchronous, chip-wide reset signal through a chip-wide distribution network with a single added pipeline stage.

FIG. 2 illustrates a circuit 100 implementing a chip-wide reset network with an added pipeline stage. Circuit 100 shows circuit 10 after a single pipeline stage 110 has been inserted. In this circuit, it is assumed that the worst-case delay from source register 20 to inserted register 110 is 2.5 ns, the worst-case delay from register 110 to distribution network buffer 42 is 0.5 ns, and that the worst-case delay from the buffer to the destination registers is 3 ns. This implementation can meet a 250 MHz clock frequency target, since 1) the worst-case delay between the source register and the inserted register is less than the clock period, 4 ns, and 2) the worst-case delay between the inserted register and the destination registers is also less than the clock period.

We observe that using the chip-wide distribution network to implement circuit 100 with a 400 MHz clock frequency target is not possible, regardless of the number of pipeline stages inserted, since the delay from distribution network buffer 42 to the user registers 32-38 is too large (i.e., greater than the clock period). Therefore, signal 40 is routed to its destinations using alternate routing resources. In this situation, where alternate routing resources are used, the described technique inserts as many pipeline stages as necessary in order to distribute signal 40 to all the destination registers 32-38 while satisfying the timing requirements associated with the recovery and removal analysis on this asynchronous signal.

The potential also exists to utilize pipeline stages that appear after the distribution network buffer.

Figure 8:
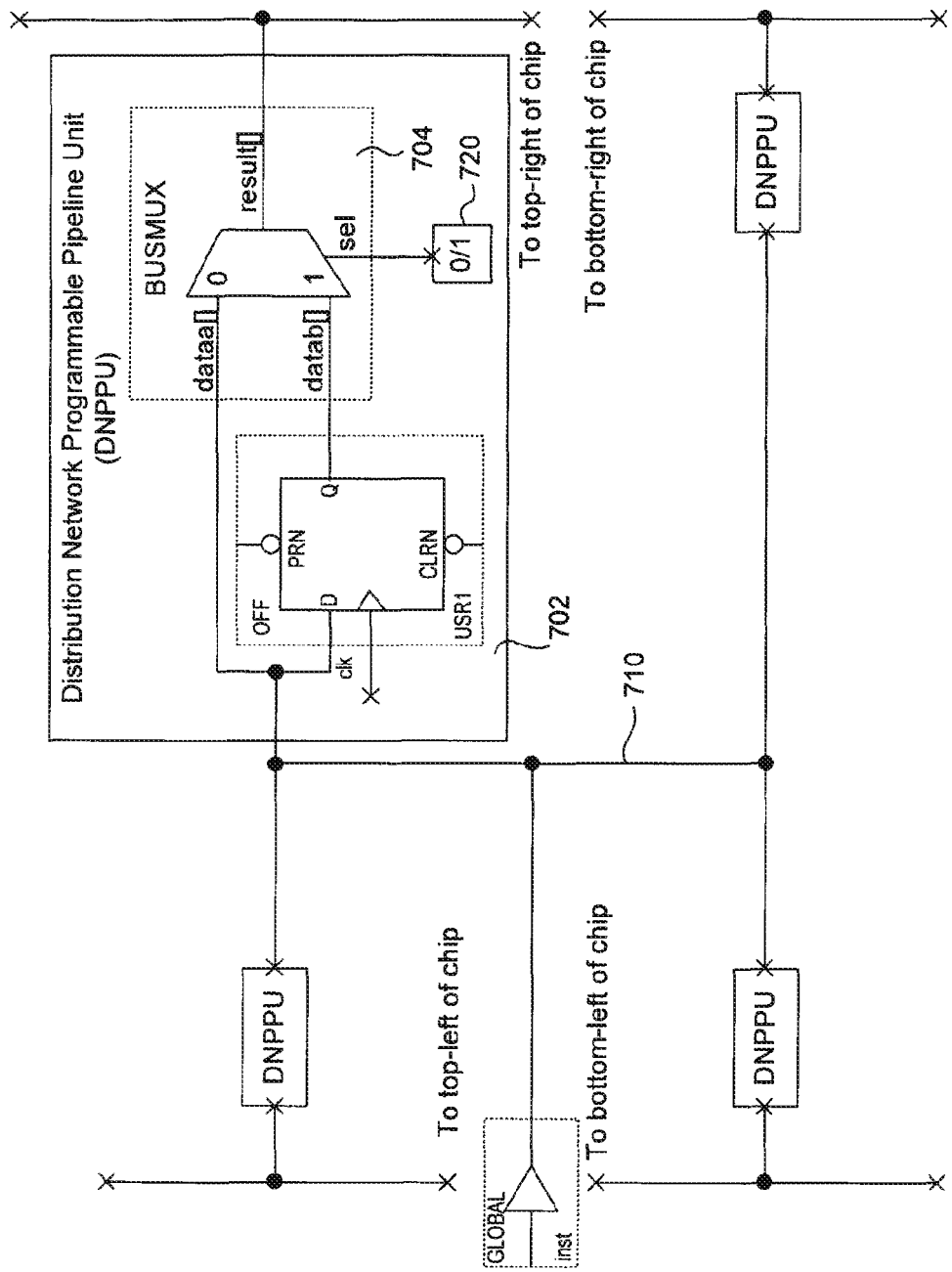
FIG. 8 illustrates distribution of a signal being routed through a pipeline stage inserted after the distribution network buffer.

FIG. 8 illustrates such a situation. A pipeline stage includes of a number of pipeline units at equal distances (in terms of delay) from the distribution network buffer such that there are an equal number of pipeline stages from the distribution network buffer to every destination register reachable by the distribution network. In a programmable device (such as an FPGA), a 'Distribution Network Programmable Pipeline Unit' (DNPPU) 702 includes a 2-to-1 MUX 704 that selects between a registered and unregistered copy of the signal 710 being propagated along the distribution network. The 'select' signal is, preferably, generated by a programmable SRAM bit 720 whose value is chosen by the EDA tool based on whether this network should use a pipeline stage after the distribution network buffer. In a non-programmable device (such as an ASIC), there is no need to build the 2-to-1 MUX, since the EDA tool will identify whether a particular distribution network should have at least one pipeline stage after the distribution network buffer.

It is desirable to create a balanced tree of pipelined registers to minimize the number of inserted registers to successfully distribute the asynchronous signal to its destination registers. It is acceptable to arbitrarily distribute the fanout among the leaf pipeline registers since all of the elements at a given stage in the pipelined network are logically equivalent.

Figure 3:
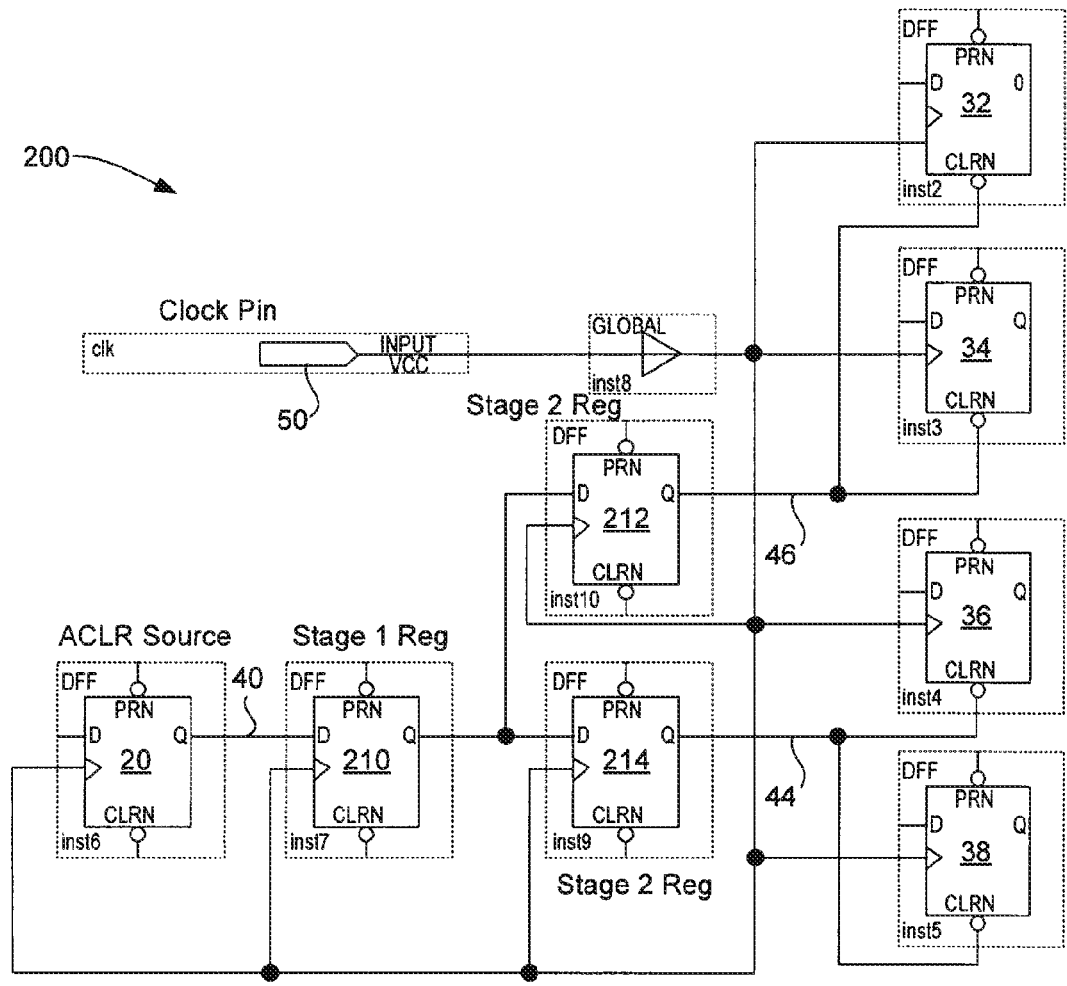
FIG. 3 illustrates distribution of an asynchronous, chip-wide reset signal with multiple added pipeline stages.

FIG. 3 illustrates a circuit 200 implementing a chip-wide reset network with added pipeline stages. ACLR signal 40 is routed through two pipeline stages using alternate routing resources in order to satisfy a 400 MHz performance target. In this figure, the worst-case delay from source register 20 to the first pipeline stage register 210 is 2 ns, the worst-case delay from the first pipeline stage to the second stage pipeline registers 212 and 214 is 2 ns, and the worst-case delay from the second stage registers to the user registers is 2 ns. As the clock period is 2.5 ns, the timing requirements for a 400 MHz performance target are met.

Detailed Implementation Example

The following details assist the electronic design automation software in implementing the asynchronous signal pipelining technique described above by automatically altering the user's design to meet timing requirements. A number of high-level considerations are useful to keep in mind during implementation: 1) prefer algorithms that minimally perturb the user's design, 2) use intelligent optimization decisions given the logical equivalence of pipeline registers, and 3) ensure that all phases of the EDA tool are aware of the decisions made by the asynchronous signal pipelining technique. Electronic design automation software typically performs the steps of logic synthesis and fitting to compile a logic design. Fitting can include, but is not limited to, the following phases: 1) initial physical synthesis, 2) distribution network assignment, 3) placement, 4) post-placement physical synthesis, and 5) routing. Distribution network assignment is a phase that identifies signals that should utilize the distribution networks available in the target device. This phase is typically conducted when the logic design is implemented in a device that includes prefabricated distribution networks.

As the present invention identifies and fixes situations where traditional placement and routing algorithms result in failed circuit timing for asynchronous signals, the described technique should not be liberally applied in order to increase the slack on connections sourced by asynchronous signals. Furthermore, the technique preferably inserts a minimal number of registers and pipeline stages in order to satisfy timing requirements and to minimize the area overhead incurred by using this technique.

Another important consideration is that any decision made by one phase of the fitting process should, preferably, not be reversed by a later phase of the fitting process. Reversing decisions is not only confusing for both users and developers, but it can be significantly sub-optimal. For example, consider the case where the user has many high-speed asynchronous signals that cannot use a distribution network and successfully meet timing. If the distribution network assignment phase does not account for these requirements and selects some and/or all these signals to a distribution network, these distribution networks will go unused since the asynchronous signal pipelining technique will not use distribution networks to route these signals. In order to avoid this problem, it is preferable that the distribution network assignment phase, if it is used in the EDA tool, be aware that certain high-fanout asynchronous signals should not use a distribution network due to timing considerations. Therefore, other signals can be promoted to the distribution networks (if desired) to maximize the utilization of the distribution networks. In order to intelligently select the signals that use the available distribution networks, it is preferable for the EDA tool to be able to identify the delay for a signal to travel through each of distribution networks available in the target device.

Preferably, the described technique will select whether distribution networks should be used for each asynchronous signal before placement commences. Furthermore, if distribution networks are to be used for a given distribution signal, this technique will select the appropriate distribution network for each signal based on the region required to route the signal's destination registers, the timing requirements of the asynchronous signal, and the availability of the distribution networks. In a specific embodiment, user assignments that force a particular asynchronous signal to utilize a distribution network should take precedence over any decision made by the described technique. In this situation, the EDA tool should indicate to the user that the user's assignments will likely cause a deterministic failure in recovery and removal analysis.

The following paragraph provides details regarding the placement phase. The placement algorithm should not assign any gain for placing the fanout of the asynchronous signal with the source register since there will likely be an intermediate register between the source and destination, negating most of the benefit of placing the source and destination registers in the same cluster. But, as the most practical usage of this technique is for high-fanout signals, implementing this awareness in the placement algorithm has a minimal impact on overall quality of results, since many placement algorithms utilize connection weights that are inversely proportional to the fanout of the entire net.

Preferably, the pipeline registers are inserted during a post-placement physical synthesis phase. If the pipeline registers are inserted in this phase, the placement algorithm should not negatively cost the timing terms for connections that will experience automatic signal pipelining. This is accomplished by either ignoring the results of any recovery and removal analyses performed during placement or by setting an infinite multi-cycle constraint on the asynchronous signals that are legally allowed to be pipelined. The wirelength component of the placement cost function does not need to be altered, since the addition of pipeline stages does not significantly change the total wirelength required to route the signal, given that fanout redistribution can be performed on the registers that are part of the last inserted pipeline stage.

As previously mentioned, the pipeline insertion process of the described technique is preferably implemented in a post-placement physical synthesis stage. During this stage, physical synthesis runs a recovery and removal analysis on the design using the timing estimates from placement and identifies the asynchronous networks that will fail timing (or are extremely timing marginal). The physical synthesis phase then inserts a minimal number of pipeline stages for the candidate asynchronous signals that have not been restricted from automatic pipeline stage insertion (as described below). Candidate asynchronous signals refer to the signals that will experience performance benefit by utilizing the described technique.

Figure 4:
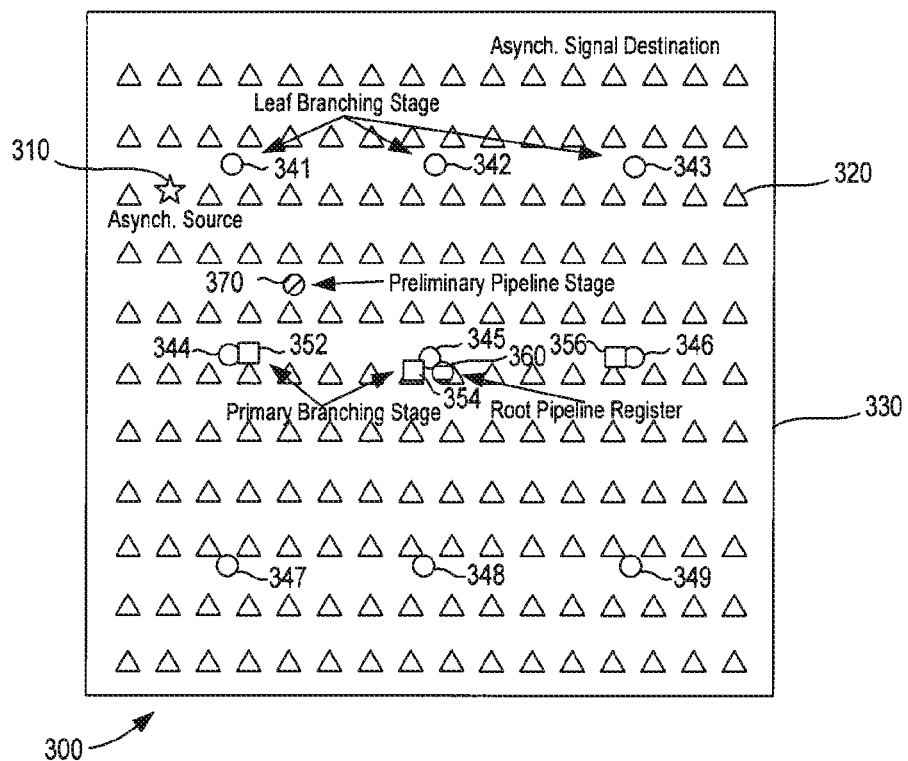
FIG. 4 illustrates an example of pipeline register insertion.

FIG. 4 illustrates a circuit 300 that represents the effect of pipeline register insertion. In this example, an asynchronous source 310 is desired to be routed to any number of asynchronous signal destinations 320. In accordance to meet the user's clock frequency targets, it is desired that the worst-case delay for all register to register paths between the signal's source and destinations be less than the clock period.

In the preferred implementation, the process of inserting pipeline stages is carried out in the following manner:

In a first step, the physical synthesis phase queries the EDA tool for the dimensions and shape of a physical region that can be routed in n ns from a register located at the center of the region. The parameter n is based from the user's clock frequency target and, preferably, is guardbanded to account for potential discrepancies between their current predicted delays and final values. We observe that this region is not necessarily rectangular.

In a second step, a determination is made of the extent of the entire asynchronous network 330 and "leaf" pipeline registers 341-349 are inserted to cover the entire network, based on the region size obtained in the first step. These pipeline registers are part of a "branching stage." In this example, the region obtained in the first step is square and covers an area slightly larger than one-ninth of the entire device. Given this region size and shape, it is sufficient to use nine "leaf" pipeline registers to cover every potential asynchronous signal destination.

In a third step, step two is repeated using the inserted pipeline registers as the new boundary of the asynchronous network. This loop is terminated when the entire region can be covered with a single register. The pipeline registers 352-356 in the final region are part of the "primary branching stage." The single register 360 covering that region is termed the "root pipeline register."

In a fourth step, if the source is located such that it can cover the boundary of the asynchronous network at the end of the third step 3, the process is done. Otherwise, the process continues inserting "preliminary pipeline stages" with exactly one register in order to route the source to the root pipeline register while satisfying the timing requirements imposed by recovery and removal analysis. In this simple example, a single register 370 is inserted between root pipeline register 360 and asynchronous source 310. In operation, the asynchronous signal will begin at asynchronous source 310, be routed through registers 370 and 360, be routed through the tree of pipeline registers 352-356 and 341-349, and then finally be routed from these leaf registers on to each asynchronous signal destination.

This process is designed to minimize the total number of registers inserted for the network. By minimizing the number of inserted registers, the additional power requirements needed to satisfy the user's timing requirements are also indirectly minimized.

Preferably, there should be no updates to the routing phase of the EDA tool, at this point in the EDA tool flow, the netlist is complete. It is worth observing, however, that routing algorithms can utilize the fact that all registers in the same pipeline stage (of a single asynchronous signal that has been pipelined by the described technique) are logically equivalent. Specifically, the router can minimize the wirelength required to route all connections between adjacent pipeline stages by dynamically redistributing fanout during the routing algorithm. We also observe that this router optimization has the potential for power savings, since any pipeline register that is inserted by the described technique and no fanout after routing can be removed after routing completes.

In the embodiment shown in FIG. 8 in which a pipeline register or registers are inserted after the distribution network buffer, the above algorithm is modified as follows.

If the target device has the ability to utilize an arbitrary number of pipeline stages after the distribution network buffer, the EDA tool inserts the minimum number of pipeline stages such that the single stage delay through the distribution network and associated pipeline stages is small enough to satisfy the user's timing requirements. We define 'min_num_pipe_stages' as this minimum number of pipeline stages. The algorithm then proceeds assuming that the delay through the distribution network is equal to the delay from the distribution network buffer to the first pipeline stage (after the buffer).

If the distribution networks in the target device are fixed, then an asynchronous signal can use the distribution network if there are at least 'min_num_pipe_stages' fixed pipeline stages available. If so, the algorithm selects 'min_num_pipe_stages' pipeline stages that cause all timing requirements to be satisfied, makes the appropriate connections, and then proceeds assuming that the delay through the distribution network is equal to the delay from the distribution network buffer to the first pipeline stage (after the buffer). Preferably, the algorithm selects the 'min_num_pipe_stages' pipeline stages that are as close to the source register as possible while still meeting the timing requirements. This algorithmic preference minimizes the absolute number of pipeline registers inserted. Minimizing the absolute number of pipeline registers is desirable since it reduces the additional power consumption caused by the inserted registers.

Utilizing Stitched Distribution Networks

The previous section describes how the present asynchronous signal pipelining technique is able to automatically insert one or more pipeline register stages in between an asynchronous signal source and its destination registers in the absence of a distribution network, which requires alternate routing resources to be used, or in the presence of a single distribution network. This section describes how an asynchronous signal can be pipelined and subsequently routed through multiple distribution networks to achieve a final design that has the potential to achieve higher performance targets. A set of distribution networks sourced by the same signal is referred to as a stitched distribution network.

In many user designs, asynchronous signals connect to a large number of registers that are typically placed across the entire device. Up to this point, the only suitable distribution network that could be selected by the technique is one that reaches all potential destination registers in the device—a chip-wide distribution network. It is realized, however, that it is possible to route the asynchronous signal through a stitched distribution network, provided that each destination register is reachable by at least one of the distribution networks that is part of the stitched network. Typically, in many devices, the worst-case delay of a distribution network decreases (i.e., the network becomes faster) as the area that is reachable by the distribution network is reduced. Therefore, utilizing multiple smaller networks can lead to increased circuit performance. In addition to the performance benefits, the ability to use multiple smaller distribution networks offers greater flexibility for the EDA tool to select assign an appropriate distribution network, or set of networks, for candidate asynchronous signals in the user's design.

Figure 5:
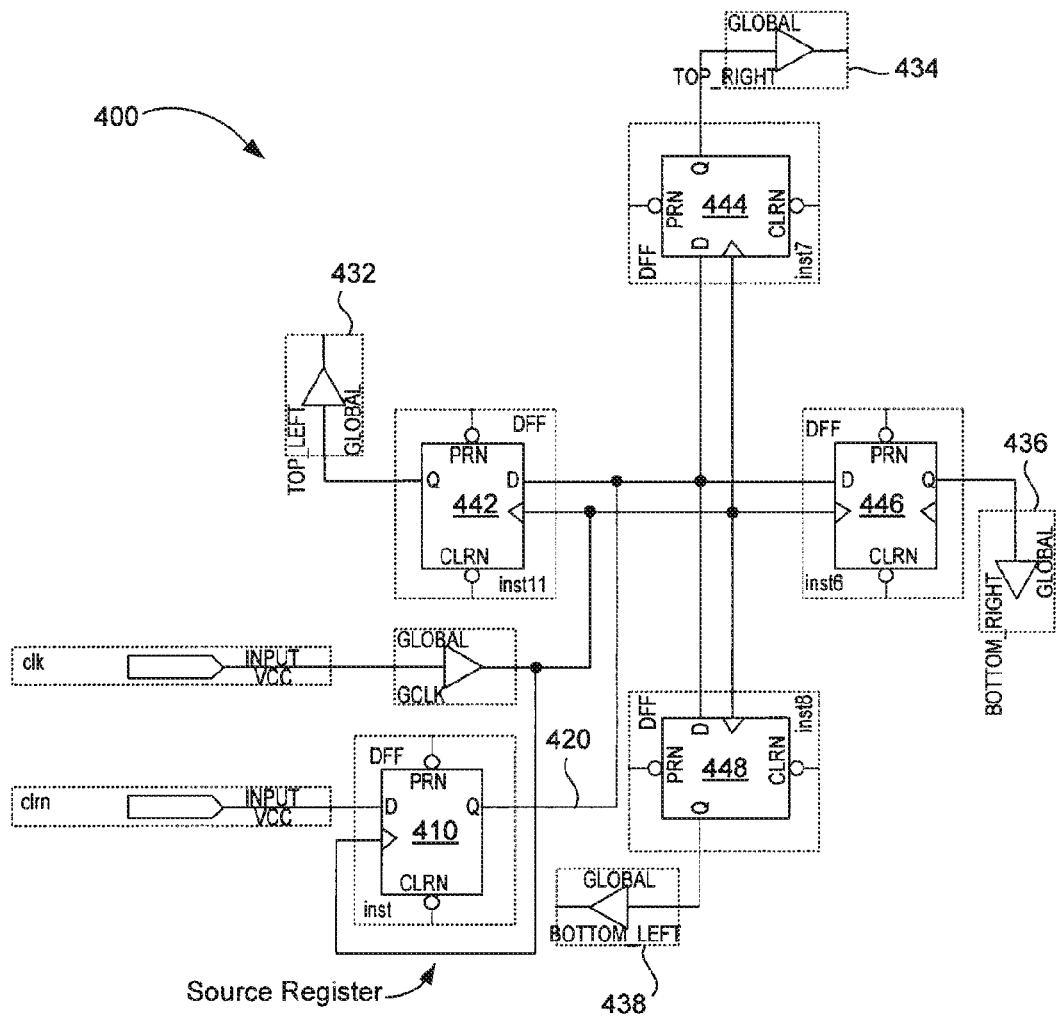
FIG. 5 illustrates distribution of an asynchronous, chip-wide reset signal through multiple smaller distribution networks with a single added pipeline stage between the source and the distribution network buffers.

FIG. 5 illustrates distribution of an asynchronous signal using four disjoint distribution networks, each reaching all potential destinations in a non-overlapping quadrant of the device. In this example, these distribution networks will be referred to as quadrant networks. Specifically, the figure uses the names TOP_LEFT, TOP_RIGHT, BOTTOM_LEFT, and BOTTOM_RIGHT. To represent the four disjoint distribution networks that reach the top left, top right, bottom left, and bottom right regions of the device, respectively. Circuit 400 contains source register 410. This source register outputs signal 420, which is to be distributed to a significant number of destination registers scattered throughout the device (not shown). The device has four quadrant networks, 432-438, available for use by this signal. Inserted registers 442-448 comprise a pipeline stage that assists in delivering signal 420 to each of the quadrant networks. Since each quadrant network reaches one-fourth of the device, the delay through the quadrant network will necessarily be less than the delay through a chip-wide distribution network. Furthermore, due to the presence of a pipeline stage, we observe that the worst-case delay from registers 442-448 to the destination registers (i.e., the delay through the quadrant networks) is smaller than the worst-case delay obtained if a chip-wide distribution network was used. Therefore, the asynchronous signal can be successfully distributed to all requisite destination registers, while satisfying all timing requirements at a higher performance target. Although not shown, it is possible to insert additional pipeline stages between the source and the destination registers in order to meet the design's timing requirements.

In the preferred implementation, the process of automatically routing asynchronous signals while utilizing faster distribution networks is carried out in the following manner:

In a first step, the EDA tool, preferably in the distribution network assignment phase, identifies whether a candidate asynchronous signal should be routed through general routing resources, a single distribution network, or a set of distribution networks (which form a stitched network). If a stitched network is used, it is desirable for each of distribution networks to have the same worst-case delay from the distribution network buffer to the destinations in order to minimize the skew between the arrival times of the asynchronous signal at the destination registers. In the preferred implementation, the distribution network assignment phase selects the smallest number of distribution networks that 1) will not violate the user's timing requirements if a pipeline register is placed immediately before the distribution network buffer and 2) does not impose any placement restrictions on the asynchronous signal's destinations. Typically, this requires the selected network(s) to be able to reach every potential destination in the device, unless additional information is provided by the user. This phase, preferably, also considers distribution network availability. Since this section describes implementation details for a stitched network, all subsequent steps will be under the assumption that the candidate asynchronous signal is using a stitched network In a second step, the EDA tool creates one pipeline register for each distribution network and places the registers at locations that have close proximity to their associated distribution network buffer. The connectivity of the asynchronous signal is changed such that the source directly connects to the pipeline registers and the pipeline registers connect to the original destination registers of the asynchronous signal. The exact connectivity between the pipeline stage and the destination registers cannot be determined at this point, since the final placement of the destination registers is not currently available. Preferably, the creation of these registers occurs before the placement phase commences.

In a third step, the technique of the present invention is used to insert additional pipeline stages (if required) between the asynchronous signal source and the pipeline registers created in step two. A minimal number of pipeline stages should be inserted in order to satisfy the user's timing requirements.

In a fourth step, the placement algorithm should be altered to ignore the current illegality of these connections, since it is guaranteed that at least one distribution network in the stitched network can reach the destination register, regardless of its location chosen by the EDA tool. In one embodiment, the placement algorithm identifies the suitable region of the device reachable by the stitched network and limits the placement of all destination registers to the suitable region.

In a fifth step, after the placement phase is finished, the netlist is modified such that the last pipeline stage, comprising of the registers created in the second step, connects to all the original destination registers of the asynchronous signal. Preferably, each destination register is connected to a pipeline register that has closest proximity to a distribution network buffer (in the stitched network) that reaches the destination register.

Exploiting Beneficial Skew

In an alternative embodiment, it is possible to introduce beneficial skew into the components of the design in order to allow more high-speed user designs to utilize one or more distribution networks, in conjunction with the insertion of pipeline stages, while successfully satisfying all user timing constraints. Because the inherent delay in a global network is often a problem for high-speed user designs, the embodiment described below will prove useful.

Figure 6:
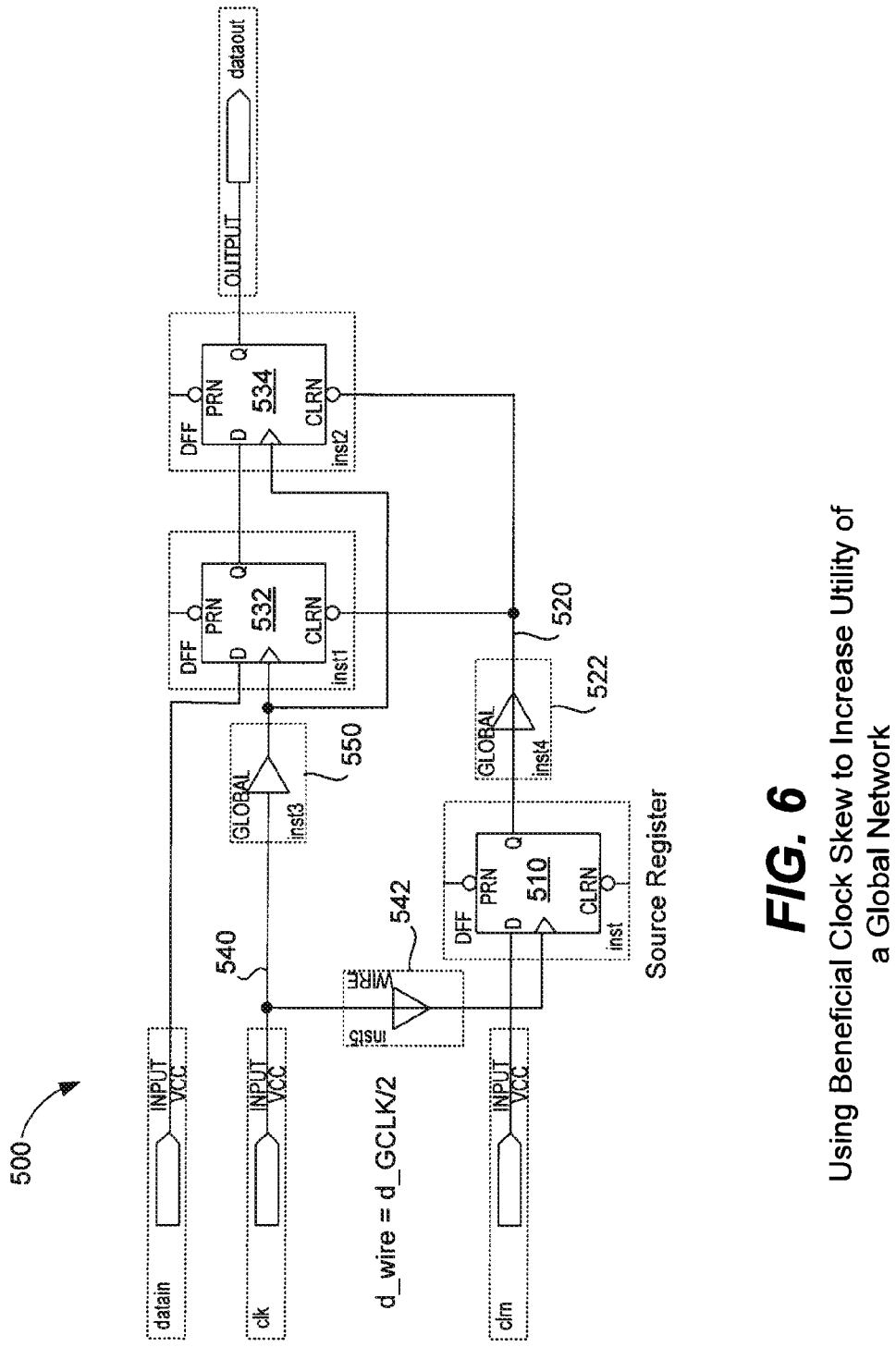
FIG. 6 illustrates a circuit that uses beneficial skew in order to increase the utility of a distribution network.

FIG. 6 illustrates a circuit 500 that uses beneficial clock skew in order to increase the utility of a global network. Shown is an asynchronous source register 510 outputting signal 520 to be delivered to user registers 532 and 534 via buffer 522. Clock signal 540 is distributed to the user registers via a distribution network 550, while component 542 skews the clock signal, with respect to distribution network 550, before it is delivered to the asynchronous source register. Component 542 introduces a predictable delay into the circuit. In a typical device, component 542 can be implemented by a series of interconnect resources and logic gates, such that the total delay of those resources is equal to a desired delay, based on the equations described in this section. Preferably, component 542 will be implemented using device components similar to the structure of the distribution network(s) being used. Implementing component 542 in this manner reduces the effect of manufacturing variability, since the delay of that component will likely scale in a similar fashion to distribution networks 520 and 550, which is a desirable property to have given that the purpose of this invention is to reliably satisfy timing requirements for asynchronous signal routing.

In general, in order to guarantee that the asynchronous signal arrives at the destination registers within a single clock cycle, we select components 522, 542, and 550 such that their delays satisfy the following timing relationship:

$$\text{delay}(550) \leq \text{delay}(542) + \text{delay}(520) \leq \text{delay}(550) + \frac{1}{f_{MAX}}$$

If distribution network 520 has an identical delay to distribution network 550, this equation, simply reduces to $$\text{delay}(542) \leq \frac{1}{f_{MAX}},$$

since component 542 cannot have a negative delay. We observe, though, that this timing relationship should be satisfied for all possible device implementations. This is a significant observation, since the effect of manufacturing variability may cause distribution network 520 to be slightly faster than distribution network 550 in one device, but may cause distribution network 520 to be slightly slower than distribution network 550 in another device. Therefore, if one designs delay(542) to be slightly less than delay(550), we can trivially satisfy the left-hand side of the equation and give slightly more timing margin for the right-hand side of the equation. This statement is true since, in previous embodiments of technique, component 542 was simply the chip-wide distribution network 550. For this embodiment to be effective, the delay of component 542 should always be less than the delay of component 550.

It is further realized that if at least one timing path becomes easier (a looser timing requirement) due to the utilization of beneficial skew, another timing path becomes more difficult (a tighter timing requirement). In the circuit 500 of FIG. 6, the path that becomes more difficult is the clrn to the data input port of asynchronous source register 510. If the clrn is truly asynchronous, then the EDA tool does not need to actively consider the tightened timing requirement in the optimization problem. But, if the source of the register is synchronous, the EDA tool needs to recognize that some register transfer before distribution network buffer 522 may have a tighter timing requirement.

Figure 7:
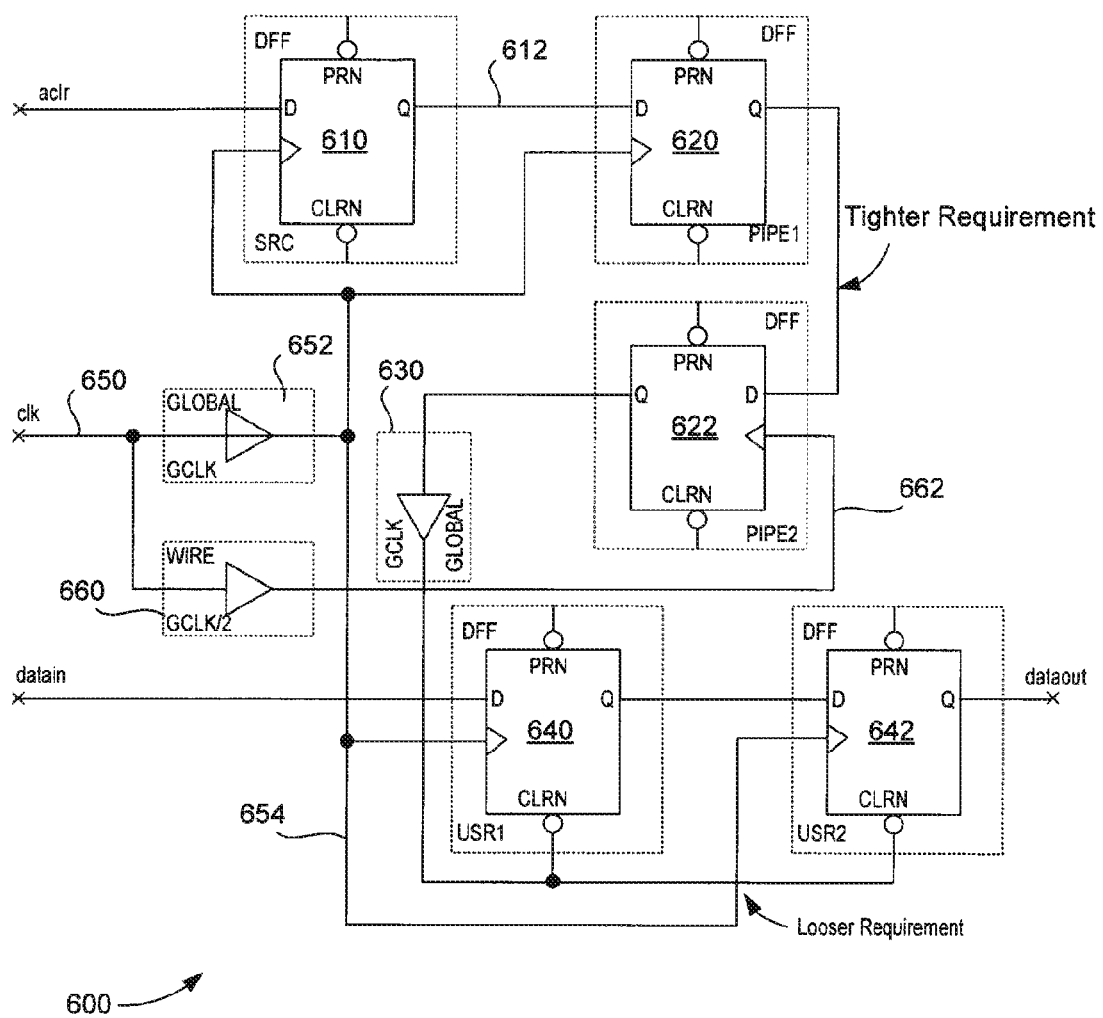
FIG. 7 illustrates the effect of beneficial skew on the timing requirements of an example distribution of an asynchronous, chip-wide reset signal.

FIG. 7 illustrates the effect of beneficial clock skew on timing requirements. Shown is a circuit 600 having a source register 610 that produces asynchronous signal 612 to be delivered to any number of user registers. Signal 612 passes through pipeline registers 620 and 622 before being fed via distribution network buffer 630 to the user registers 640 and 642. Clock signal 650 is delivered to the source register and the user registers via distribution network buffer 652. Clock signal 650 is delayed using component 660 before being delivered to pipeline register 622 as clock signal 662. In addition to the previous timing requirements described in this section, this circuit obeys the following timing relationship:

$$\text{delay}(652) + \text{delay}(620 \to 622) \leq \frac{1}{f_{MAX}} + \text{delay}(660)$$

Because clock signal 662 (i.e., the skewed clock signal), which is derived from clock signal 650, arrives at register 622 before clock signal 654 arrives at register 620, a tighter timing requirement is introduced on the signal that travels from the output of register 620 to the input of register 622. Necessarily, the timing requirement between pipeline register 622 and user registers 640 and 642 is loosened. For example, assume that it takes 4 ns for clock signal 650 to travel through distribution network 652 and arrive at register 620. Also, assume it takes 2.5 ns for clock signal 650 to travel through delay component 660 and arrive at register 622.

We first observe that without beneficial skew, the circuit cannot operate faster than 250 MHz, since the delay of the distribution network is 4 ns. Using this circuit, though, a 400

MHz target can be achieved, since we have loosened the timing requirement between register 622 and the user registers by 1.5 ns.

This value is computed by subtracting delay(660) from delay(652). To be legal, this circuit completes the transfer between register 620 and register 622 in only 1 ns. This value is obtained by taking the inverse of the desired frequency target, adding delay(660), and then subtracting delay(652). For completeness, we observe that the introduction of beneficial skew creates a theoretical maximum frequency for the logic design, which is defined by the following equation:

$$f_{MAX} \leq \frac{1}{\text{delay}(652) - \text{delay}(660)}$$

The embodiment is not restricted to the exact topology illustrated in FIG. 7. We observe than any number of pipeline registers is possible. Preferably, the technique inserts the minimum number of pipeline stages in order to meet all timing requirements. Additionally, the skewed clock signal 662 can be delivered to more than one pipeline register. For example, if the skewed clock signal is used by both pipeline register 620 and pipeline register 622, the circuit should complete the transfer between register 620 and register 622 within one clock period. But, the timing requirement on the data transfer between register 610 and register 622 is tightened.

In the preferred implementation, the component that is used to create the skewed clock signal should have a delay that maximizes the potential frequency target of the device. For typical usage, the distribution network 630 will have a similar delay as distribution network 652. In this case, the maximum target frequency is limited by the following equation:

$$f_{MAX} \leq \min\left(\frac{1}{\text{delay}(652) - \text{delay}(660) + \alpha}, \frac{1}{\text{delay}(660)}\right)$$

In the previous equation, α represents the theoretical minimum delay for a register-to-register transfer to be carried out in the device. Typically, α is small relative compared to either delay(652) or delay(660). Therefore, to maximize the target frequency, delay(660) should have a delay roughly equal to ½ of delay(652). These equations can be easily modified to consider the case when the delay of distribution network 630 is not equal to the delay of distribution network 654.

The present invention thus describes a technique that enables an EDA tool to alter a user's netlist to guarantee timing success for a distribution of asynchronous signals. A single distribution network is used with the addition of pipeline registers if timing permits, otherwise, a tree of pipeline registers may be added, stitched distribution networks are used, or beneficial skew is utilized. A combination of the compilation techniques may be used within the EDA tool to solve the problem of distributing asynchronous signals to their destinations. This technique has most utility for high-speed, high-fanout asynchronous signals present in high-performance FPGAs and structured ASIC families, but can also be applied to all asynchronous signals in low-cost FPGAs and other types of logic devices.

Computer System Embodiment

Figure 9A:
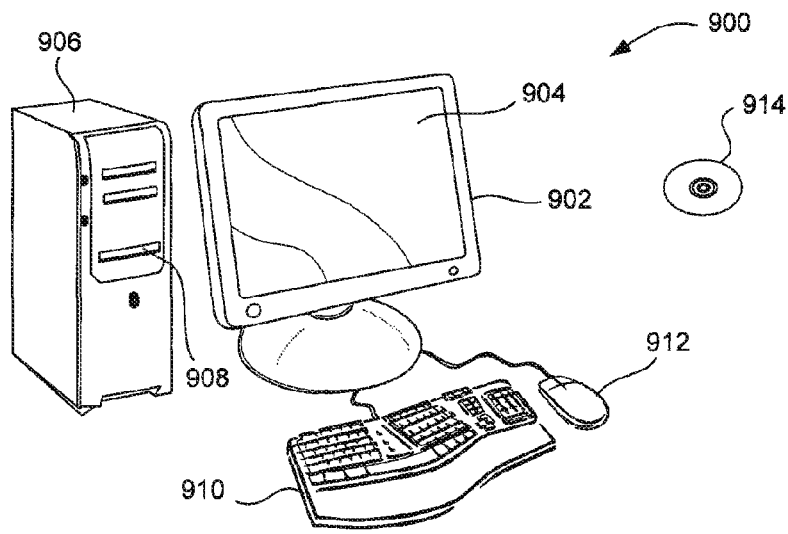
FIGS. 9A and 9B illustrate a computer system suitable for implementing embodiments of the present invention.
Figure 9B:
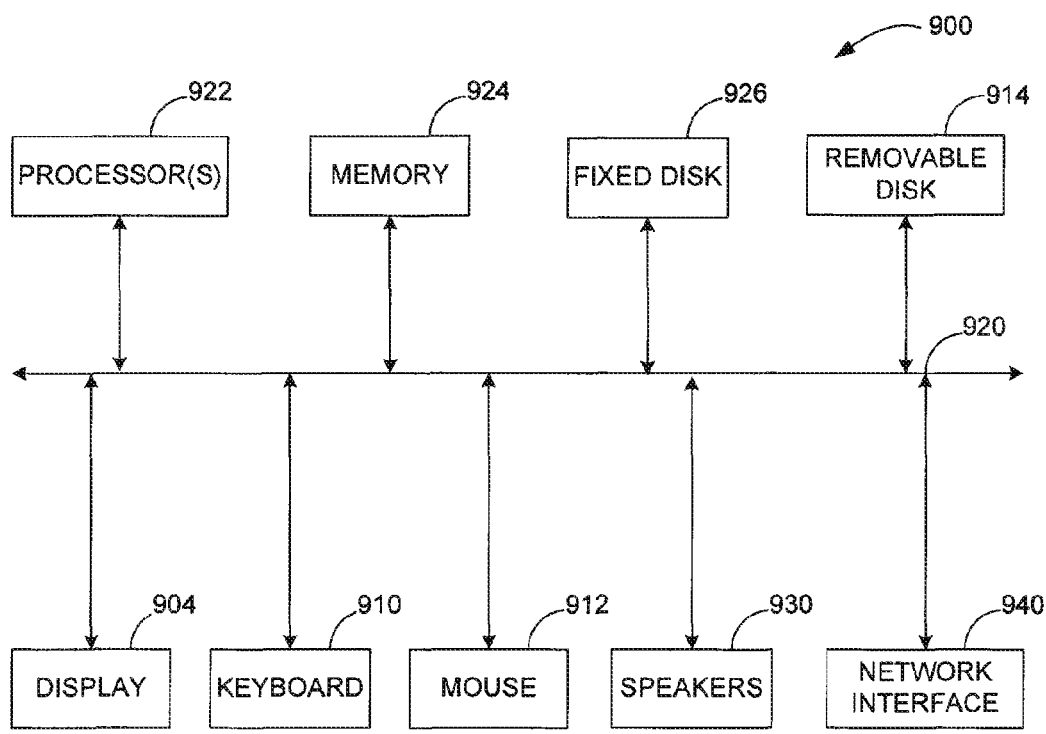

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An integrated circuit, said integrated circuit comprising:
a plurality of destination storage elements;
a source of an asynchronous signal, said asynchronous signal provided to said destination storage elements with a first interconnect;
a distribution network providing the output from a distribution buffer to said destination storage elements with a second interconnect;
a pipeline having a first storage element and a second storage element, the pipeline inserted between said distribution buffer and the source of said asynchronous signal, the first storage element coupled with the first interconnect for receiving the asynchronous signal from the source of the asynchronous signal and providing the asynchronous signal to the second storage element, the second storage element providing the asynchronous signal to the distribution buffer with the second interconnect;
a first clock distribution network providing a clock signal from a first clock source to the first storage element and the plurality of destination storage elements with a third interconnect;
a second clock distribution network providing the clock signal from the first clock source to the second storage element with a fourth interconnect, wherein a delay of the second clock distribution network providing the clock signal to the second storage element is less than a delay of the first clock distribution network providing the clock signal to the first storage element.

2. An integrated circuit as recited in claim 1, whereby said asynchronous signal arrives at said destination storage elements within a same clock cycle of said clock signal.

3. An integrated circuit as recited in claim 1 wherein said pipeline provides said asynchronous signal to said distribution buffer.

4. An integrated circuit as recited in claim 1 wherein the source of said asynchronous signal is a register.

5. An integrated circuit as recited in claim 1 further comprising:
a plurality of other distribution networks that provide from distribution buffers to additional portions of said destination storage elements.

6. An integrated circuit as recited in claim 1 wherein at least one storage element is inserted between said distribution buffer and a first portion of said destination storage elements, and wherein at least one storage element is inserted between a second distribution buffer and a second portion of said destination storage elements.

7. An integrated circuit as recited in claim 1 wherein the destination storage elements are registers.

8. A method of inserting pipeline storage elements into a logic design to be implemented in a circuit, said method comprising:
inserting, by a processor, in the logic design, a pipeline having a first storage element and a second storage element, the pipeline inserted between a source of an asynchronous signal and a distribution buffer, the distribution buffer to provide the asynchronous signal to a plurality of destination storage elements;
routing a clock signal to a first clock distribution network and a second clock distribution network, the first clock distribution network to provide the clock signal to the first storage element and the plurality of destination storage elements, the second clock distribution network to provide the clock signal to the second storage element, wherein a delay of the second clock distribution network providing the clock signal to the second storage element is less than a delay of the first clock distribution network providing the clock signal to the first storage element.

9. A method as recited in claim 8, whereby said asynchronous signal arrives at said destination storage elements within a same clock cycle of said clock signal.

10. A method as recited in claim 8 further comprising:
selecting a set of suitable distribution networks that utilize a plurality of distribution buffers to distribute said asynchronous signal.

11. A method as recited in claim 8 further comprising:
inserting at least one storage element after said distribution buffer and before said destination storage elements.

12. A method as recited in claim 8 wherein the destination storage elements are registers.

13. A method as recited in claim 8 wherein the asynchronous signal is a reset signal.

14. A method as recited in claim 8 wherein the asynchronous signal source is a register.

15. A non-transitory computer readable medium having instructions for routing an asynchronous signal within a logic design to be implemented in a circuit stored thereon, the instructions executable by a processor to:
insert a pipeline having a first storage element and a second storage element, the pipeline inserted between a source of an asynchronous signal and a distribution buffer, the distribution buffer to provide the asynchronous signal to a plurality of destination storage elements;
route a clock signal to a first clock distribution network and a second clock distribution network, the first clock distribution network to provide the clock signal to the first storage element and the plurality of destination storage elements, the second clock distribution network to provide the clock signal to the second storage element, wherein a delay of the second clock distribution network providing the clock signal to the second storage element is less than a delay of the first clock distribution network providing the clock signal to the first storage element.

16. The non-transitory computer readable medium of claim 15, whereby said asynchronous signal arrives at said destination storage elements within a same clock cycle of said clock signal.

17. The non-transitory computer readable medium of claim 15, said instructions further executable by said processor to:
select a set of suitable distribution networks that utilize a plurality of distribution buffers to distribute said asynchronous signal.

18. The non-transitory computer readable medium of claim 15, said instructions further executable by said processor to:
insert at least one storage element after said distribution buffer and before said destination storage elements.

19. The non-transitory computer readable medium of claim 15, wherein the destination storage elements are registers.

20. The non-transitory computer readable medium of claim 15, wherein the asynchronous signal is a reset signal.

* * * * *